United States Patent
Lee et al.

(10) Patent No.: US 11,776,092 B2
(45) Date of Patent: Oct. 3, 2023

(54) COLOR RESTORATION METHOD AND APPARATUS

(71) Applicant: LG ELECTRONICS INC., Seoul (KR)

(72) Inventors: Woonchae Lee, Seoul (KR); Wonsu Choi, Seoul (KR); Seonhui Sunny Kim, Seoul (KR); Minho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 16/789,883

(22) Filed: Feb. 13, 2020

(65) Prior Publication Data
US 2021/0133932 A1    May 6, 2021

(30) Foreign Application Priority Data
Nov. 1, 2019    (KR) .................. 10-2019-0138856

(51) Int. Cl.
*G06T 5/00*    (2006.01)
*G06T 7/90*    (2017.01)

(52) U.S. Cl.
CPC .............. *G06T 5/002* (2013.01); *G06T 7/90* (2017.01); *G06T 2207/10024* (2013.01); *G06T 2207/20081* (2013.01); *G06T 2207/20084* (2013.01)

(58) Field of Classification Search
CPC ... G06T 7/90; G06T 7/97; G06T 2207/10024; G06T 2207/20081; G06T 2207/20084; G06T 9/002
USPC .................. 382/254, 274–275, 162–167
See application file for complete search history.

(56) References Cited

U.S. PATENT DOCUMENTS

| | | | |
|---|---|---|---|
| 5,754,316 A * | 5/1998 | Hayashi ............... | H04N 1/6075 358/512 |
| 9,349,297 B1 * | 5/2016 | Ortiz .................... | G06K 9/6215 |
| 2002/0048400 A1 * | 4/2002 | Leedham ............... | G01J 3/508 382/167 |
| 2005/0207644 A1 * | 9/2005 | Kitagawara ............ | H04N 1/393 382/167 |
| 2010/0110312 A1 * | 5/2010 | Muijs ................... | H04N 1/6058 348/802 |

(Continued)

FOREIGN PATENT DOCUMENTS

WO   WO-2015189343 A1 * 12/2015 .......... G06T 11/001

OTHER PUBLICATIONS

Yan, Zhicheng, H. Zhang, B. Wang, Sylvain Paris and Y. Yu. "Automatic Photo Adjustment Using Deep Learning." ArXiv abs/1412.7725 (2014): n. pag. (Year: 2014).*

(Continued)

*Primary Examiner* — Sean M Conner
(74) *Attorney, Agent, or Firm* — Birch, Stewart, Kolasch & Birch, LLP

(57) ABSTRACT

Disclosed herein is a color restoration method and apparatus. The color restoration method may include pre-processing an input image, determining whether color is distorted, and restoring the color of the input image in an RGB scale or a grayscale according to whether the color is distorted. According to the present disclosure, color of a low light image may be restored using a deep neural network model trained through deep learning of a 5G network and color restoration.

14 Claims, 12 Drawing Sheets

(56) References Cited

U.S. PATENT DOCUMENTS

| | | | | |
|---|---|---|---|---|
| 2011/0262019 A1* | 10/2011 | Shen | .................. | G06T 11/001 |
| | | | | 382/131 |
| 2012/0099788 A1* | 4/2012 | Bhatti | .................. | G01J 3/462 |
| | | | | 382/167 |
| 2012/0190440 A1* | 7/2012 | Perlow | .................. | G09G 5/003 |
| | | | | 463/31 |
| 2015/0178587 A1* | 6/2015 | Chamaret | ............... | G06T 5/005 |
| | | | | 382/164 |
| 2016/0027190 A1* | 1/2016 | Minagawa | .............. | G06T 5/001 |
| | | | | 382/167 |
| 2018/0177434 A1* | 6/2018 | Kim | .................. | A61B 5/6898 |
| 2019/0065884 A1* | 2/2019 | Li | .................. | G06K 9/6267 |
| 2019/0066338 A1* | 2/2019 | Perlman | ............ | G06K 19/0614 |
| 2020/0234402 A1* | 7/2020 | Schwartz | ............. | G06T 3/4015 |
| 2021/0085238 A1* | 3/2021 | Schnabel | ............. | A61B 5/4542 |
| 2022/0067421 A1* | 3/2022 | Zhang | .................. | G06T 11/00 |

OTHER PUBLICATIONS

H. -H. Choi and B. -J. Yun, "Deep Learning-Based Computational Color Constancy With Convoluted Mixture of Deep Experts (CMoDE) Fusion Technique," in IEEE Access, vol. 8, pp. 188309-188320, 2020, doi: 10.1109/ACCESS.2020.3030912. (Year: 2020).*

* cited by examiner

COLOR RESTORATION METHOD AND APPARATUS

CROSS-REFERENCE TO RELATED APPLICATION

This present application claims the benefit of priority to Korean Patent Application No. 10-2019-0138856, entitled "Color restoration method and apparatus," filed on Nov. 1, 2019, in the Korean Intellectual Property Office, the entire disclosure of which is incorporated herein by reference.

BACKGROUND

1. Technical Field

The present disclosure relates to a color restoration method and apparatus. More particularly, the present disclosure relates to a method for restoring a color of an image photographed in a low light environment to a color similar to a unique color, and an apparatus using the method.

2. Description of Related Art

An image photographed in a low light environment inevitably includes noise. Since noise becomes amplified as ISO sensitivity increases, the amount of noise in a low light image may further increase. In addition, in a low light environment, a subject is not exposed to more than a threshold amount of light, and accordingly, the subject is exposed to a color distortion phenomenon in which a unique color of the subject is not reflected. Therefore, a low light enhancement process may include a color restoration process together with enhancement of brightness and contrast.

According to the related art, color of an object is restored by adjusting brightness and contrast ratio of a low light image through histogram equalization or tone mapping, which is a color restoration method. However, even in light of histogram equalization and tone mapping, there is a limitation in restoring a unique color of a subject due to low pixel values caused by a low light environment.

One related art discloses an apparatus for enhancing color of a low exposure image. According to this related art, a reference histogram is generated through an extension of an original histogram of an input image, and the input image is corrected based on the original histogram and the reference histogram. However, according to this related art, color of the input image is enhanced based on the histograms, and thus there is still a limitation with respect to color restoration indicated in the related art.

In addition, another related art discloses a method for correcting low light color. According to this related art, an input image is corrected with a new color based on a new mapping table. However, there is a limitation in terms of practicality since a learning object for generating a mapping table is ambiguous, and an IR image and a visible light image need to be photographed for each photographic image.

SUMMARY OF THE INVENTION

The present disclosure is directed to addressing the issue associated with the related art based on histogram equalization, which may be suitable for brightness correction, but lacks restoration of color information.

The present disclosure is further directed to addressing the issue associated with the related art based on tone mapping, which fails to simultaneously achieve contrast enhancement of a dark area and detail preservation of a bright area.

The present disclosure is further directed to addressing the issue associated with the related art, which fails to generate color information corresponding to an object in a low light environment, by using a deep neural network (DNN).

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is understood that the objects and advantages of the present disclosure may be embodied by the means and a combination thereof in claims.

To achieve the above aspects, there is provided a color restoration method according to an embodiment of the present disclosure. The color restoration method may include pre-processing an input image, determining whether color of the pre-processed input image is distorted by using a detected reference image, and restoring the color of the input image in an RGB scale or a grayscale according to whether the color is distorted.

Further, the pre-processing the input image may include at least one process among noise reduction, contrast enhancement, super resolution, and brightness enhancement of the input image. The noise reduction may include noise reduction by a low light enhancement model of a DNN.

Further, the determining whether the color of the input image is distorted may include detecting the reference image to be compared with the input image, and determining whether the color of the input image is distorted through color comparison between the input image and the reference image.

Further, the detecting the reference image may include detecting an image including an object in the input image and a common object as the reference image.

Further, the detecting the reference image may include detecting, as the reference image, an image including an object displayed in a single color or an object including a specific color in common among objects displayed in the input image.

Further, detecting the reference image may include detecting the reference image based on at least one condition among a light level of the input image, a type of a light source, a location at which the input image is photographed, and a time.

Further, detecting the reference image may include detecting, as the reference image, an image having an RGB distribution most similar to an RGB distribution of the input image among candidate images based on an RGB distribution on a histogram of the input image.

Further, the restoring the color of the input image may include restoring the color of the input image by using a DNN trained through deep learning of color restoration for an image photographed in a low light environment.

Further, the restoring the color of the input image may include restoring the color of the input image by using the DNN based on the reference image.

Further, the restoring the color of the input image in the grayscale may include converting the input image into a grayscale, and colorizing a grayscale input image or colorizing the grayscale image based on an RGB value of an input image before conversion.

Further, the color restoration method may further include training the DNN through deep learning of color restoration for an image photographed in a low light environment by using, as input data from a training data set, an image to which at least one among noise reduction, contrast enhancement, super resolution, and brightness enhancement is applied as pre-processing.

Further, the deep learning of the color restoration may include on-device learning, which is a type of transfer learning performed on the DNN using personal data other than the training data set.

According to the present disclosure, natural color restoration is possible, together with brightness correction for an image photographed in a low light environment.

In addition, a low light image photographed by a small-sized camera module having limited shutter speed and aperture adjustment may be corrected to realize original color of an object.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
FIG. 1 is an exemplary view of a color restoration method according to an embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In the following description of the embodiments of the present disclosure, a detailed description of related arts will be omitted when it is determined that the gist of the embodiments disclosed herein may be obscure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is an exemplary view of a color restoration method according to an embodiment of the present disclosure.

Referring to FIG. 1, a color restoration method by a color restoration apparatus, according to an embodiment of the present disclosure, is illustrated. The color restoration method may be applied to an image photographed in a low light environment. The color restoration apparatus may restore color of an inputted low light image, and then output the enhanced image. The color restoration method may include noise reduction and brightness/contrast adjustment as a pre-processing step in addition to color restoration through deep learning.

Figure 2:
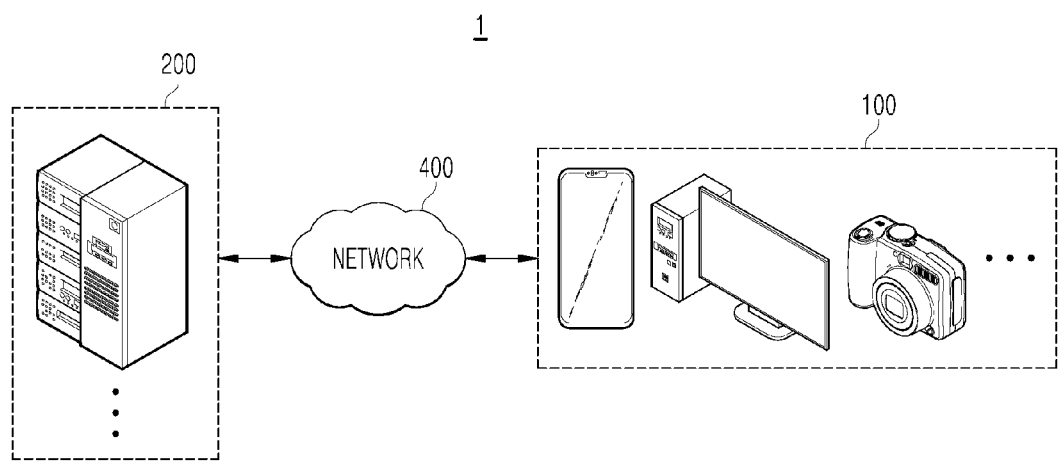
FIG. 2 is an exemplary view of a network environment to which a color restoration apparatus is connected according to an embodiment of the present disclosure.

FIG. 2 is an exemplary view of a network environment to which a color restoration apparatus is connected according to an embodiment of the present disclosure.

Referring to FIG. 2, it is illustrated that a network environment 1 includes a terminal, a desktop computer, and a digital camera corresponding to a color restoration apparatus 100, a learning device 200, and a network 500 for communicatively connecting above-described components with each other so that the components communicate mutually.

The color restoration apparatus 100 according to an embodiment of the present disclosure may be represented as devices such as a terminal, a desktop computer, and a digital camera, depending on the form of implementation, but is not limited to the scope illustrated in FIG. 2.

Hereinafter, the color restoration apparatus 100 according to an embodiment of the present disclosure will be described with focus on the terminal 100 among various embodiments of the color restoration apparatus. Unless there are other special assumptions or conditions, the description of the terminal 100 may be applied to other forms of color restoration apparatus such as a desktop computer and a digital camera.

The color restoration apparatus 100 may use the learning device 200 in a color restoration process. That is, the color restoring apparatus 100 may use an artificial intelligence (AI) model stored in the learning device 200, for example, a deep neural network (DNN) after being trained by the learning device 200. In addition, the color restoration apparatus 100 may restore the color of the image by using the AI model which is trained by the learning device 200 and stored in the color restoration apparatus 100 via download. Details of AI will be described later.

The learning device 200 may train and evaluate various neural networks through the AI model used for color restoration according to one embodiment of the present disclosure, for example, learning. The AI model completed after the evaluation is finished may be used by the color restoration apparatus 100 in a state of being stored in the learning device 200 or the color restoration apparatus 100. The learning device 200 will be described in detail.

The network 500 may be an appropriate communication network including wired and wireless networks, such as a local area network (LAN), a wide area network (WAN), the Internet, the Intranet, and the extranet and a mobile network such as cellular, 3G, LTE, 5G, a Wi-Fi network, an AD hoc network, and a combination thereof.

The network 500 may include connection of network elements such as hubs, bridges, routers, switches, and gateways. The network 500 may include one or more connected networks, including a public network such as the Internet and a private network such as a secure corporate private network. For example, the network may include a multi-network environment. The access to the network 500 may be provided via one or more wired or wireless access networks.

The terminal 100 may transmit and receive data with a learning device 200 which is a learning device, through a 5G network. Specifically, the color restoration apparatus 100 implemented as the terminal 100 may perform data communication with the learning device 200 using at least one service among enhanced mobile broadband (eMBB), ultra-reliable and low latency communications (URLLC), and massive machine-type communications (mMTC) through the 5G network.

eMBB is a mobile broadband service, and provides, for example, multimedia contents and wireless data access. In addition, more improved mobile services such as a hotspot and a wideband coverage for receiving mobile traffic that are tremendously increasing may be provided through eMBB. Through a hotspot, high-volume traffic may be accommodated in an area where user mobility is low and user density is high. A wide and stable wireless environment and user mobility may be secured by a wideband coverage.

The URLLC service defines requirements that are far more stringent than existing LTE in terms of reliability and transmission delay of data transmission and reception, and corresponds to a 5G service for production process automation in fields such as industrial fields, telemedicine, remote surgery, transportation, safety, and the like.

mMTC (massive machine-type communications) is a service that is not sensitive to transmission delay requiring a relatively small amount of data transmission. mMTC enables a much larger number of terminals, such as sensors, than general mobile cellular phones to be simultaneously connected to a wireless access network. In this case, the price of the communication module of a terminal should be low and a technology improved to increase power efficiency and save power is required to enable operation for several years without replacing or recharging a battery.

The AI is one field of computer science and information technology that studies methods to make computers mimic intelligent human behaviors such as reasoning, learning, self-improving and the like.

In addition, the AI does not exist on its own, but is rather directly or indirectly related to a number of other fields in computer science. In recent years, there have been numerous attempts to introduce an element of the AI into various fields of information technology to solve problems in the respective fields.

Machine learning is an area of AI that includes the field of study that gives computers the capability to learn without being explicitly programmed.

Specifically, the Machine Learning may be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and the like.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a DNN, a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

A general Single-Layer Neural Network is composed of an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The Output layer receives a signal from the Hidden layer, and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the DNN including a plurality of Hidden layers between the Input layer and the Output layer may be a representative ANN that implements Deep Learning, which is a type of Machine Learning technology.

The ANN may be trained by using training data. Herein, the training may mean a process of determining a parameter of the ANN by using training data in order to achieve the objects such as classification, regression, clustering, etc. of input data. As a representative example of the parameter of the ANN, there may be a weight given to a synapse or a bias applied to a neuron.

The ANN trained by the training data may classify or cluster the input data according to the pattern of the input data.

Meanwhile, the ANN trained by using the training data may be referred to as a trained model in the present specification.

Next, the learning method of the ANN will be described.

The learning method of the ANN may be largely classified into Supervised Learning, Unsupervised Learning, Semi-supervised Learning, and Reinforcement Learning.

The Supervised Learning is a method of the Machine Learning for inferring one function from the training data.

Then, among the thus inferred functions, outputting consecutive values is referred to as regression, and predicting and outputting a class of an input vector is referred to as classification.

In the Supervised Learning, the ANN is learned in a state where a label for the training data has been given.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

In addition, in the present specification, setting the label to the training data for training of the ANN is referred to as labeling the labeling data on the training data.

Training data and labels corresponding to the training data together may form a single training set, and as such, they may be inputted to an ANN as a training set.

Meanwhile, the training data represents a plurality of features, and the labeling the label on the training data may mean that the feature represented by the training data is labeled. In this case, the training data may represent the feature of the input object in the form of a vector.

The ANN may infer a function of the relationship between the training data and the labeling data by using the training data and the labeling data. Then, the parameter of the ANN may be determined (optimized) by evaluating the function inferred from the ANN.

Unsupervised learning is a machine learning method that learns from training data that has not been given a label.

More specifically, unsupervised learning may be a training scheme that trains an ANN to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different AIs, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An AE is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

The Reinforcement Learning may be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and the like. Also, the hyperparameters are set before learning, and model parameters may be set through learning to specify the architecture of the ANN.

For instance, the structure of an ANN may be determined by a number of factors, including the number of hidden layers, the number of hidden nodes included in each hidden layer, input feature vectors, target feature vectors, and the like.

Hyperparameters may include various parameters which need to be initially set for learning, much like the initial values of model parameters. Also, the model parameters may include various parameters sought to be determined through learning.

For example, the hyperparameters may include initial values of weights and biases between nodes, mini-batch size, iteration number, learning rate, and the like. Furthermore, the model parameters may include a weight between nodes, a bias between nodes, and the like.

Loss function may be used as an index (reference) in determining an optimal model parameter during the learning process of an ANN. Learning in the ANN involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam. GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the artificial neural network, but also to choose proper hyperparameters.

In general, the ANN is first trained by experimentally setting hyperparameters to various values, and based on the results of training, the hyperparameters may be set to optimal values that provide a stable learning rate and accuracy.

Furthermore, the color restoration apparatus 100 may re-train the AI model, which is trained by the learning device 200, using personal data of a user on the basis of a transfer learning method. In addition, the color restoration apparatus 100 may use various AI application programs provided from the learning device 200 in a process of executing the AI model and re-learning.

In an embodiment of the present disclosure, a color restoration method using the DNN, for example, a deep learning-based color restoration method may be used as two methods. One method is to train a DNN model starting from the basics, and the other is to use an already trained DNN model.

The basic training of the DNN model, that is, training of a deep network, involves a process of collecting very large sets of labeled training data and designing a network architecture to learn features and complete the model. The training of the deep network may produce excellent results, but this approach requires a large amount of training data sets, and a layer and weight setting with respect to a network used, for example, a CNN.

Many deep learning applications used in a pre-trained DNN model may use transfer learning, which is a process that involves fine-tuning the pre-trained model. In this transfer learning method, new data containing previously unknown classes may be injected into a DNN, for example, an existing DNN such as AlexNet or GoogLeNet.

By using this transfer learning method, time consumption may be reduced and a result may be quickly calculated since a model is pre-trained with big data-size image data.

The deep learning model provides high precision when extracting noise using image data, but requires a large amount of training data sets for accurate prediction.

The color restoration apparatus 100 according to an embodiment of the present disclosure may use, as one of DNN models, a CNN model that is trained by collecting image data of a user as input data and using the image data.

The CNN may restore the color of the input image by classifying the extracted features into unique categories.

Image noise processing based on machine learning may include a process of manually extracting features and classifying the extracted features. For example, a HOG feature extraction method using a support vector machine (SVM) learning algorithm may be used in an embodiment of the present disclosure. Other feature extraction algorithms, such as Harris corner, Shi & Tomasi, SIFT-DoG, FAST, AGAST, and major invariant feature (SURF, BRIEF, ORB) methods, may be used.

Figure 3:
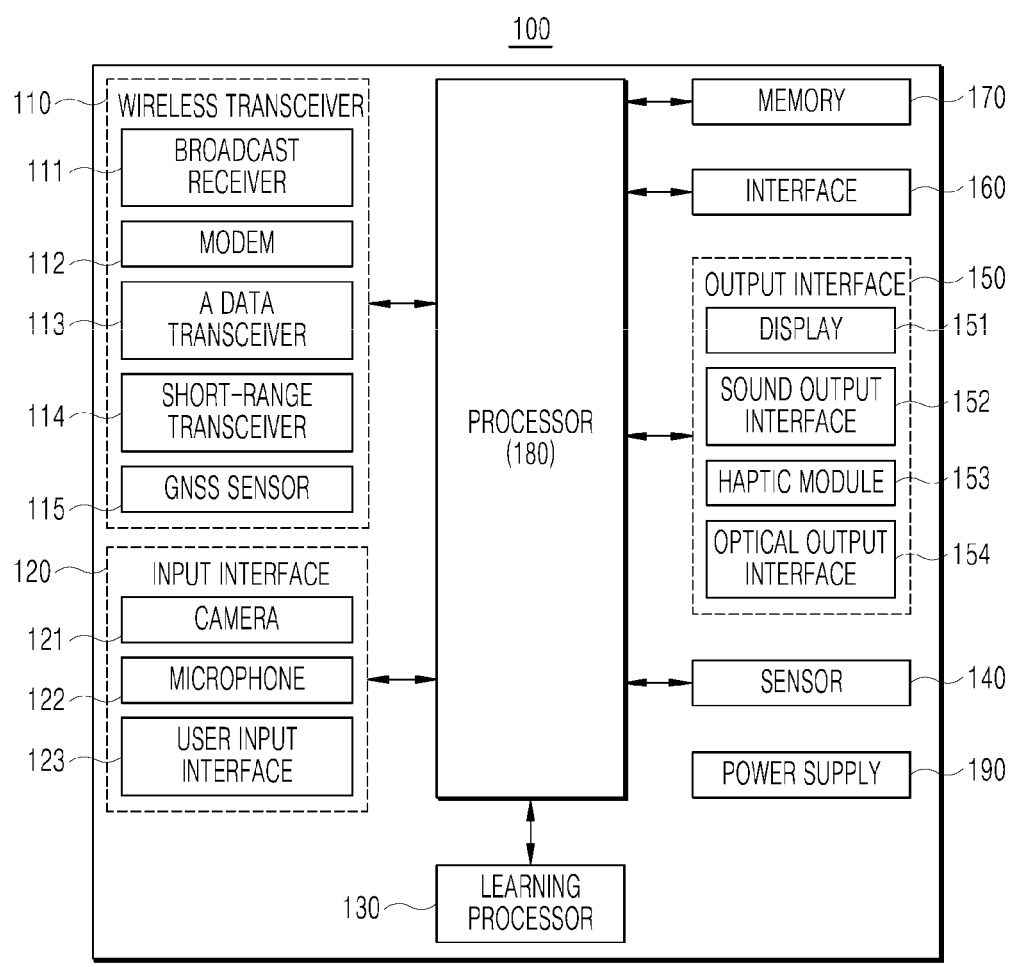
FIG. 3 is a block diagram of a color restoration apparatus according to an embodiment of the present disclosure.

FIG. 3 is a block diagram of a color restoration apparatus according to an embodiment of the present disclosure.

The terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

That is, the terminal 100 may be implemented as various home appliances used at home and also applied to a fixed or mobile robot.

The terminal 100 may perform a function of a voice agent. The voice agent may be a program which recognizes speech of the user and outputs, as speech, a response appropriate for the recognized speech of the user.

Referring to FIG. 3, the terminal 100 includes a wireless transceiver 110, an input interface 120, a learning processor 130, a sensor 140, an output interface 150, an interface 160, a memory 170, a processor 180, and a power supply 190.

A trained model may be loaded in the terminal 100.

In the meantime, the learning model may be implemented by hardware, software, or a combination of hardware and software. When a part or all of the learning model is implemented by software, one or more commands which configure the learning model may be stored in the memory 170.

The wireless transceiver 110 may include at least one among a broadcast receiver 111, a modem 112, a data transceiver 113, a short-range transceiver 114, or a GNSS sensor 115.

The broadcast receiver 111 receives a broadcasting signal and/or broadcasting related information from an external broadcasting management server through a broadcasting channel.

The modem 112 may transmit/receive a wireless signal to/from at least one among a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The data transceiver 113 refers to a module for wireless internet access and may be built in or external to the terminal 100. The data transceiver 113 may be configured to transmit/receive a wireless signal in a communication network according to wireless internet technologies.

The wireless internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support Short-range communication by using at least one among Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The GNSS sensor 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 for inputting an image signal, a microphone 122 for receiving an audio signal, and a user input interface 123 for receiving information inputted from a user.

Speech data or image data collected by the input interface 120 is analyzed to be processed as a control command of the user.

The input interface 120 may obtain training data for training a model and input data used to obtain an output using the trained model.

The input interface 120 may obtain input data which is not processed, and, in this case, the processor 180 or the learning processor 130 pre-processes the obtained data to generate training data to be inputted to the model learning or pre-processed input data.

Here, the pre-processing of input data may refer to extracting an input feature from the input data.

The input interface 120 is provided to input image information (or signal), audio information (or signal), data, or information input from the user and in order to input the image information, the terminal 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical speech data. The processed speech data may be utilized in various forms in accordance with a function which is being performed by the terminal 100 (or an application program which is being executed). In the microphone 122, various noise removal algorithms which remove noise generated during the process of receiving the external sound signal may be implemented.

The user input interface 123 receives information from the user and when the information is inputted through the user input interface 123, the processor 180 may control the operation of the terminal 100 so as to correspond to the input information.

The user input interface 123 may include a mechanical input interface (or a mechanical key, for example, a button located on a front, rear, or side surface of the terminal 100, a dome switch, a jog wheel, or a jog switch) and a touch type input interface. For example, the touch type input interface may be formed by a virtual key, a soft key, or a visual key which is disposed on the touch screen through a software process, or a touch key which is disposed on a portion other than the touch screen.

The learning processor 130 learns the model configured by an ANN using the training data.

Specifically, the learning processor 130 repeatedly trains the ANN using the aforementioned various learning techniques to determine optimized model parameters of the ANN.

In this specification, the ANN which is trained using training data to determine parameters may be referred to as a learning model or a trained model.

In this case, the learning model may be used to deduce a result for the new input data, rather than the training data.

The learning processor 130 may be configured to receive, classify, store, and output information to be used for data mining, data analysis, intelligent decision making, and machine learning algorithm and techniques.

The learning processor 130 may include one or more memories configured to store data which is received, detected, sensed, generated, previously defined, or output by another component, device, the terminal, or a device which communicates with the terminal.

The learning processor 130 may include a memory which is combined with or implemented in the terminal. In some embodiments, the learning processor 130 may be implemented using the storage 170.

Selectively or additionally, the learning processor 130 may be implemented using a memory related to the terminal, such as an external memory which is directly coupled to the terminal or a memory maintained in the server which communicates with the terminal.

According to another embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the one or more executable operations.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processing module, an environmental condition module, a speech to text (STT) processing module, a natural language processing module, a workflow processing module, and a service processing module.

The sub modules may have an access to one or more systems or data and a model, or a subset or a super set those of in the terminal. Further, each of the sub modules may provide various functions including a glossarial index, user data, a workflow model, a service model, and an automatic speech recognition (ASR) system.

According to another embodiment, another aspect of the processor 180 or the terminal may be implemented by the above-described sub module, a system, data, and a model.

In some embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a transceiver.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology, and updates the information which is previously learned based on the analyzed information.

Therefore, the processor 180 may improve precision of a future performance of the data analysis and the machine learning algorithm and technology based on the updated information, together with the learning processor 130.

The sensor 140 may include one or more sensors which sense at least one piece of information in the mobile terminal, surrounding environment information around the mobile terminal, and user information.

For example, the sensor 140 may include at least one among a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). Further, the terminal 100 disclosed in the present disclosure may combine various kinds of information sensed by at least two among the above-mentioned sensors and may use the combined information.

The output interface 150 is intended to generate an output related to a visual, aural, or tactile stimulus, and may include at least one among a display 151, sound output interface 152, haptic module 153, and optical output interface 154.

The display 151 displays (outputs) information processed in the terminal 100. For example, the display 151 may display execution screen information of an application program driven in the terminal 100 and user interface (UI) and graphic user interface (GUI) information in accordance with the execution screen information.

The display 151 forms a mutual layered structure with a touch sensor or is formed integrally to be implemented as a touch screen. The touch screen may simultaneously serve as a user input interface 123 which provides an input interface between the terminal 100 and the user and provide an output interface between the terminal 100 and the user.

The speaker 152 may output audio data received from the wireless transceiver 110 or stored in the memory 170 in a call signal reception mode, a phone-call mode, a recording mode, a speech recognition mode, or a broadcasting reception mode.

The speaker 152 may include at least one among a receiver, a speaker, or a buzzer.

The haptic actuator 153 may generate various tactile effects that the user may feel. A representative example of the tactile effect generated by the haptic actuator 153 may be vibration.

The optical output interface 154 outputs a signal for notifying occurrence of an event using light of a light source of the terminal 100. Examples of the event generated in the terminal 100 may be message reception, call signal reception, missed call, alarm, schedule notification, email reception, and information reception through an application.

The interface 160 serves as a passage with various types of external devices which are connected to the terminal 100. The interface 160 may include at least one among a wired/wireless headset port, an external charger port, a wired/wireless data port, a memory card port, a port which connects a device equipped with an identification module, an audio input/output (I/O) port, a video input/output (I/O) port, and an earphone port. The terminal 100 may perform appropriate control related to the connected external device in accordance with the connection of the external device to the interface 160.

In the meantime, the identification module is a chip in which various information for authenticating a usage right of the terminal 100 is stored and includes a user identification module (UIM), a subscriber identification module (SIM), and a universal subscriber identity module (USIM). The device with an identification module (hereinafter, "identification device") may be manufactured as a smart card. Therefore, the identification device may be connected to the terminal 100 through the interface 160.

The memory 170 stores data which supports various functions of the terminal 100.

The memory 170 may store various application programs (or applications) driven in the terminal 100, data for the operation of the terminal 100, commands, and data (for example, at least one algorithm information for machine learning) for the operation of the learning processor 130.

The memory 170 may store the model which is learned in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and the like.

In this case, the input data stored in the memory 170 may be not only data which is processed to be suitable for the model learning but also input data itself which is not processed.

In addition to the operation related to the application program, the processor 180 may generally control an overall operation of the terminal 100. The processor 180 may process a signal, data, or information which is input or output through the above-described components or drives the application programs stored in the memory 170 to provide or process appropriate information or functions to the user.

Further, in order to drive the application program stored in the memory 170, the processor 180 may control at least some of components described with reference to FIG. 3. Moreover, the processor 180 may combine and operate at least two of components included in the terminal 100 to drive the application program.

As described above, the processor 180 may control an operation related to the application program and an overall operation of the terminal 100. For example, when the state of the terminal satisfies a predetermined condition, the processor 180 may execute or release a locking state which restricts an input of a control command of a user for the applications.

The power supply 190 is applied with external power or internal power to supply the power to the components included in the terminal 100 under the control of the processor 180. The power supply 190 includes a battery, and the battery may be an embedded battery or a replaceable battery.

Figure 4:
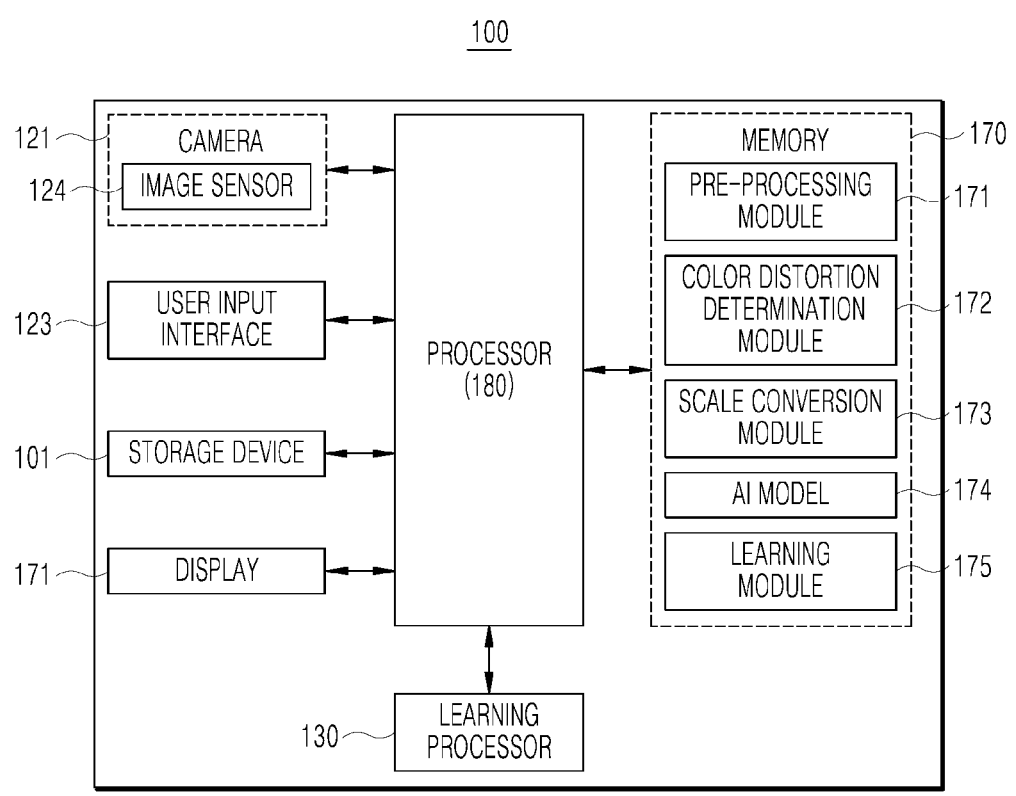
FIG. 4 is a block diagram of the memory illustrated in FIG. 3.

FIG. 4 is a block diagram of the memory illustrated in FIG. 3.

Referring to FIG. 4, components of the memory 170 included in the terminal corresponding to the color restoration apparatus 100 are briefly illustrated. Various computer program modules may be loaded in the memory 170. A pre-processing module 171, a color distortion determination module 172, a scale conversion module 173, an AI model 174, and a learning module 175 in addition to an operating system and a system program for managing hardware may be included in the scope of a computer program loaded in the memory 170.

Pre-processing of the input image associated with the pre-processing module 171, for example, noise reduction, contrast enhancement, super resolution, and brightness enhancement of the input image, may be performed through various operation functions of the processor 180. A pre-processing process of the input image may include various kinds of image processing performed before the color of the input image is restored.

A function of determining whether the color of the input image is distorted associated with the color distortion determining module 172 may be performed through various operation functions of the processor 180. The processor 180 may detect a reference image to be compared with the input image so as to determine whether the color is distorted by using the color distortion determination module 172, and may determine whether the color of the input image is distorted by comparing the color of the input image that has passed the pre-processing process with the color of the detected reference image. By comparing colors expressing an object included in common in the input image and the reference image, it may be determined whether the color is distorted based on a degree of change in pixel value of the input image relative to the reference image.

A scale conversion function of the input image associated with the scale conversion module 173 may be performed through various operation functions of the processor 180. For example, the processor 180 may convert a scale of the input image between an RGB scale and a grayscale by using the scale conversion module 173.

A color restoration function of the input image associated with the AI model 174 may be performed through various operation functions of the processor 180. The color of the image may be restored manually, automatically, or through a suitable combination of manual and automatic.

A function of re-learning an already trained AI model, for example, a DNN, by using a user's personal data, associated with the learning module 175 may be performed through various operation functions of the processor 180 or the learning processor 130.

Figure 5:
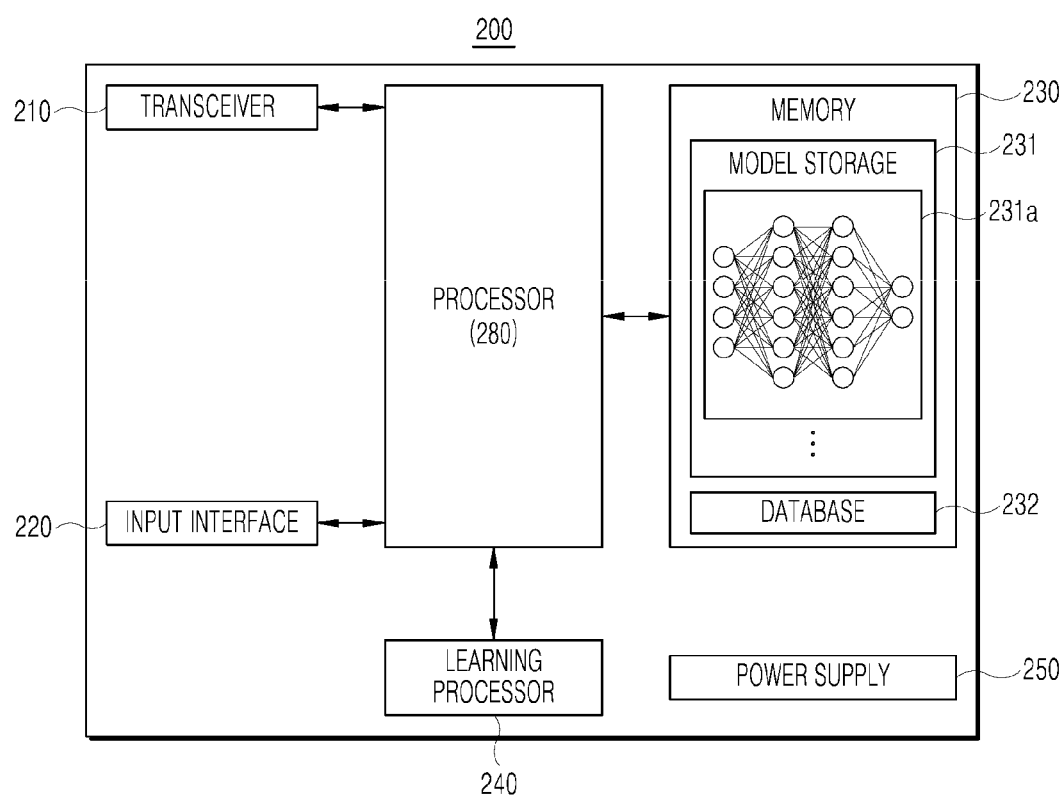
FIG. 5 is a block diagram of a learning device of an artificial intelligence model according to an embodiment of the present disclosure.

FIG. 5 is a block diagram of a learning device of an AI model according to an embodiment of the present disclosure.

The learning device 200 is a device or a server which is separately configured at the outside of the terminal 100 and may perform the same function as the learning processor 130 of the terminal 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one terminal 100 and derive a result by analyzing or learning the data on behalf of the terminal 100. Here, the meaning of "on behalf of the other device" may be distribution of a computing power by means of distributed processing.

The learning device 200 of the ANN is various devices for learning an artificial neural network and normally, refers to a server, and also referred to as a learning device or a learning server.

Specifically, the learning device 200 may be implemented not only by a single server, but also by a plurality of server sets, a cloud server, or a combination thereof.

That is, the learning device 200 is configured as a plurality of learning devices to configure a learning device set (or a cloud server) and at least one learning device 200 included in the learning device set may derive a result by analyzing or learning the data through the distributed processing.

The learning device 200 may transmit a model trained by the machine learning or the deep learning to the terminal 100 periodically or upon the request.

Referring to FIG. 5, the learning device 200 may include a transceiver 210, an input interface 220, a memory 230, a learning processor 240, a power supply 250, a processor 260, and the like.

The transceiver 210 may correspond to a configuration including the wireless transceiver 110 and the interface 160 of FIG. 3. That is, the transceiver may transmit and receive data with the other device through wired/wireless communication or an interface.

The input interface 220 is a configuration corresponding to the input interface 120 of FIG. 3 and may receive the data through the transceiver 210 to obtain data.

The input interface 220 may obtain input data for acquiring an output using training data for model learning and a trained model.

The input interface 220 may obtain input data which is not processed, and, in this case, the processor 260 may pre-process the obtained data to generate training data to be input to the model learning or pre-processed input data.

In this case, the pre-processing on the input data performed by the input interface 220 may refer to extracting of an input feature from the input data.

The memory 230 is a configuration corresponding to the memory 170 of FIG. 3.

The memory 230 may include a model storage 231, a database 232, and the like.

The model storage 231 stores a model (or an artificial neural network 231*a*) which is learning or trained through the learning processor 240 and when the model is updated through the learning, stores the updated model.

If necessary, the model storage 231 stores the trained model by dividing the model into a plurality of versions depending on a training timing or a training progress.

The artificial neural network 231a illustrated in FIG. 5 is one example of ANNs including a plurality of hidden layers but the ANN of the present disclosure is not limited thereto.

The ANN 231a may be implemented by hardware, software, or a combination of hardware and software. When a part or all of the ANN 231a is implemented by the software, one or more commands which configure the ANN 231a may be stored in the memory 230.

The database 232 stores input data obtained from the input interface 220, learning data (or training data) used to learn a model, a learning history of the model, and the like.

The input data stored in the database 232 may be not only data which is processed to be suitable for the model learning but also input data itself which is not processed.

The learning processor 240 is a configuration corresponding to the learning processor 130 of FIG. 3.

The learning processor 240 may train (or learn) the ANN 231a using training data or a training set.

The learning processor 240 may immediately obtain data which is obtained by pre-processing input data obtained by the processor 260 through the input interface 220 to learn the ANN 231a or obtain the pre-processed input data stored in the database 232 to learn the ANN 231a.

Specifically, the learning processor 240 repeatedly may train the ANN 231a using various learning techniques described above to determine optimized model parameters of the ANN 231a.

In this specification, the ANN which is trained using training data to determine parameters may be referred to as a learning model or a trained model.

In this case, the learning model may be loaded in the learning device 200 to deduce the result value or may be transmitted to the other device such as the terminal 100 through the transceiver 210 to be loaded.

Further, when the learning model is updated, the updated learning model may be transmitted to the other device such as the terminal 100 via the transceiver 210 to be loaded.

The power supply 250 is a configuration corresponding to the power supply 190 of FIG. 3.

A redundant description for corresponding configurations will be omitted.

In addition, the learning device 200 may evaluate the AI model 231a, and may update the AI model 231a for better performance after the evaluation and provide the updated AI model 231a to the terminal 100.

The terminal 100 may perform a series of steps performed by the learning device 200 solely or together with the learning device 200 via communication with the learning device 200 in a local area. For example, the terminal 100 may collect user personal data and re-train the AI model 174 of the local area through transfer learning using the collected personal data as a training data set. The AI model 174 trained through the transfer learning using the training data set composed of the user personal data may drive inferences optimized for user situations in a test step.

Figure 6:
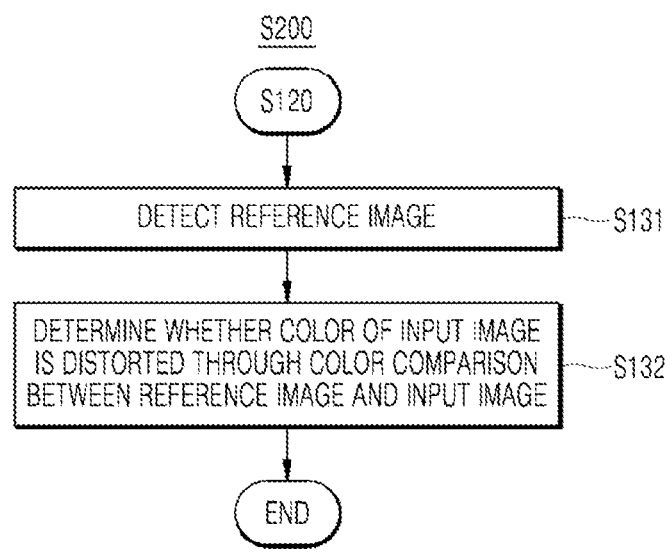
FIG. 6 is a flowchart of a color restoration method according to an embodiment of the present disclosure.

FIG. 6 is a flowchart of a color restoration method according to an embodiment of the present disclosure.

Referring to FIG. 6, the color restoration method according to an embodiment of the present disclosure (S100) may include training a DNN model (S110), pre-processing an input image (S120), determining whether color of the input image is distorted (S130), and restoring the color of the input image (S140). Here, the training the DNN model (S110) may come in any order as long as it is performed before the color restoration (S140).

The color restoration method S100 according to an embodiment of the present disclosure may be performed by the color restoration apparatus 100. Specifically, the processor 180 may perform the color restoration method S100 by using various program modules loaded in the memory and the DNN model trained through deep learning of color restoration.

In an embodiment of the present disclosure, the AI model 174, for example, the DNN model, may be used in the color restoration process S140 of the input image. Therefore, a process of pre-training the DNN model through learning may be preceded by the color restoration process S140. The learning device 200 or the color restoration apparatus 100 may train the DNN model through deep learning on color restoration (S110).

For deep learning of color restoration, a training data set composed of input data and training data may be used. That is, a DNN may be trained through deep learning of the color restoration method of an image photographed in a low light environment, by using a pre-processed image as the input data of the training data set. Here, pre-processing may include at least one among noise reduction, contrast enhancement, super resolution, and brightness enhancement.

Figure 7:
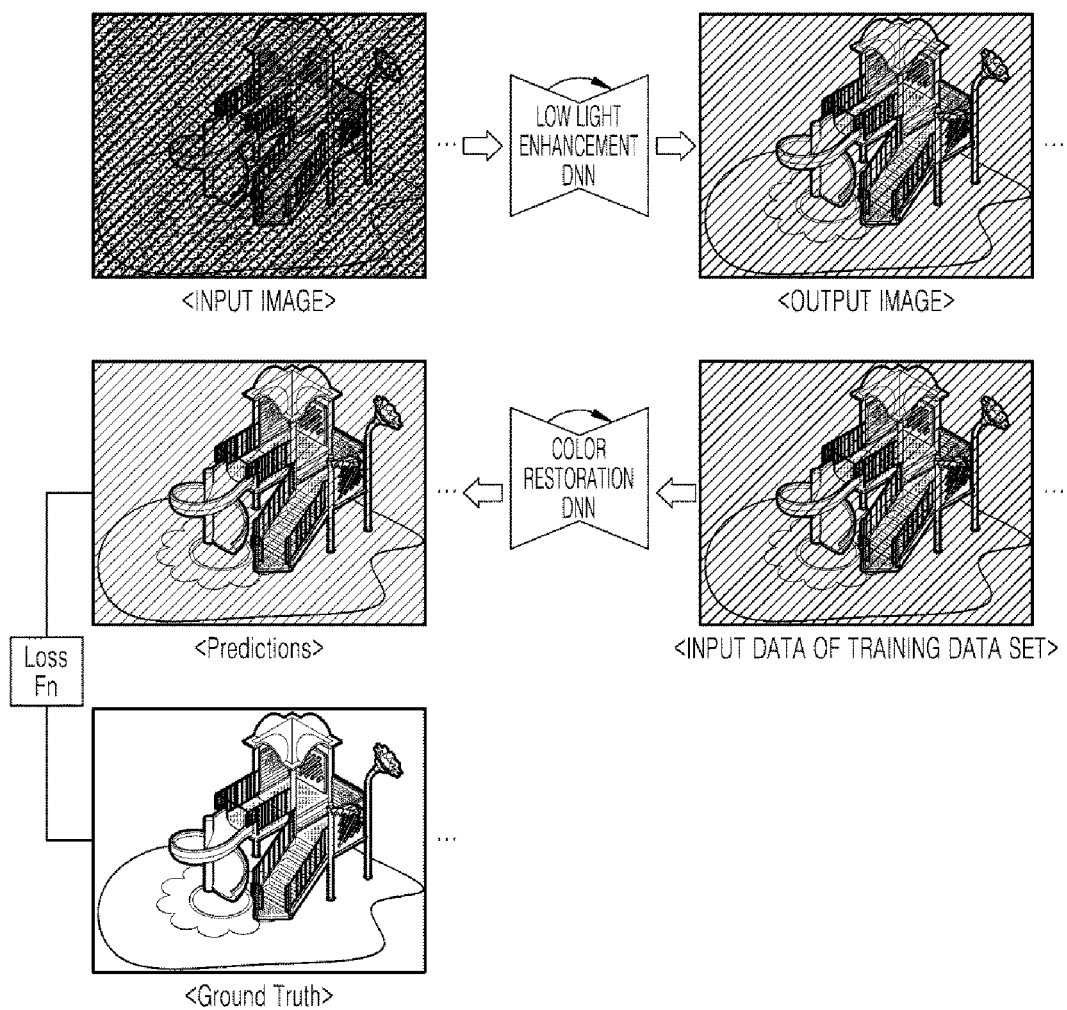
FIG. 7 is an exemplary view of deep neural network training according to an embodiment of the present disclosure.

FIG. 7 is an exemplary view of DNN training according to an embodiment of the present disclosure.

Referring to FIG. 7, a training process of a DNN model through deep learning of color restoration is illustrated. Deep learning of color restoration may include low light enhancement and color restoration. That is, deep learning of color restoration may be performed by using an image in which at least one among noise reduction, contrast enhancement, super resolution, and brightness enhancement is enhanced by low light enhancement, before deep learning of color restoration.

Referring to FIG. 7 again, deep learning, which receives a distorted color image and restores color, is illustrated. A deep learning process of color restoration may be represented as a process of minimizing a value of a loss function occurring between an inferred image and a ground truth image.

As described above, the DNN according to an embodiment of the present disclosure may be re-trained through transfer learning. That is, deep learning of color restoration according to an embodiment of the present disclosure may include on-device learning, which is a type of transfer learning performed using personal data other than the training data set (S111).

In order to colorize an image, reference images for learning purposes that are separate from the reference image used to determine whether the color of the input image is distorted according to an embodiment of the present disclosure are required. The reference images for learning purposes may be prepared as a pair of grayscale images and color images.

A global descriptor may be extracted from the reference image, and the reference images may be adaptively grouped into different clusters based on the global descriptor. Through operations, a semantic histogram for each cluster may be calculated.

Among a pair of reference images, a feature descriptor may be calculated from each pixel of a color image, and a corresponding chrominance value may be calculated from each pixel of a grayscale image. A DNN may be designed for each cluster. The designed DNN may be trained using a training data set composed of the feature descriptor and the chrominance value.

As the input of the DNN, a pair of vectors each representing the feature descriptor calculated from the color image and the chrominance value calculated from the grayscale image may be used. As a result of training the DNN through learning, a learned DNN assemble may be obtained.

Figure 8:
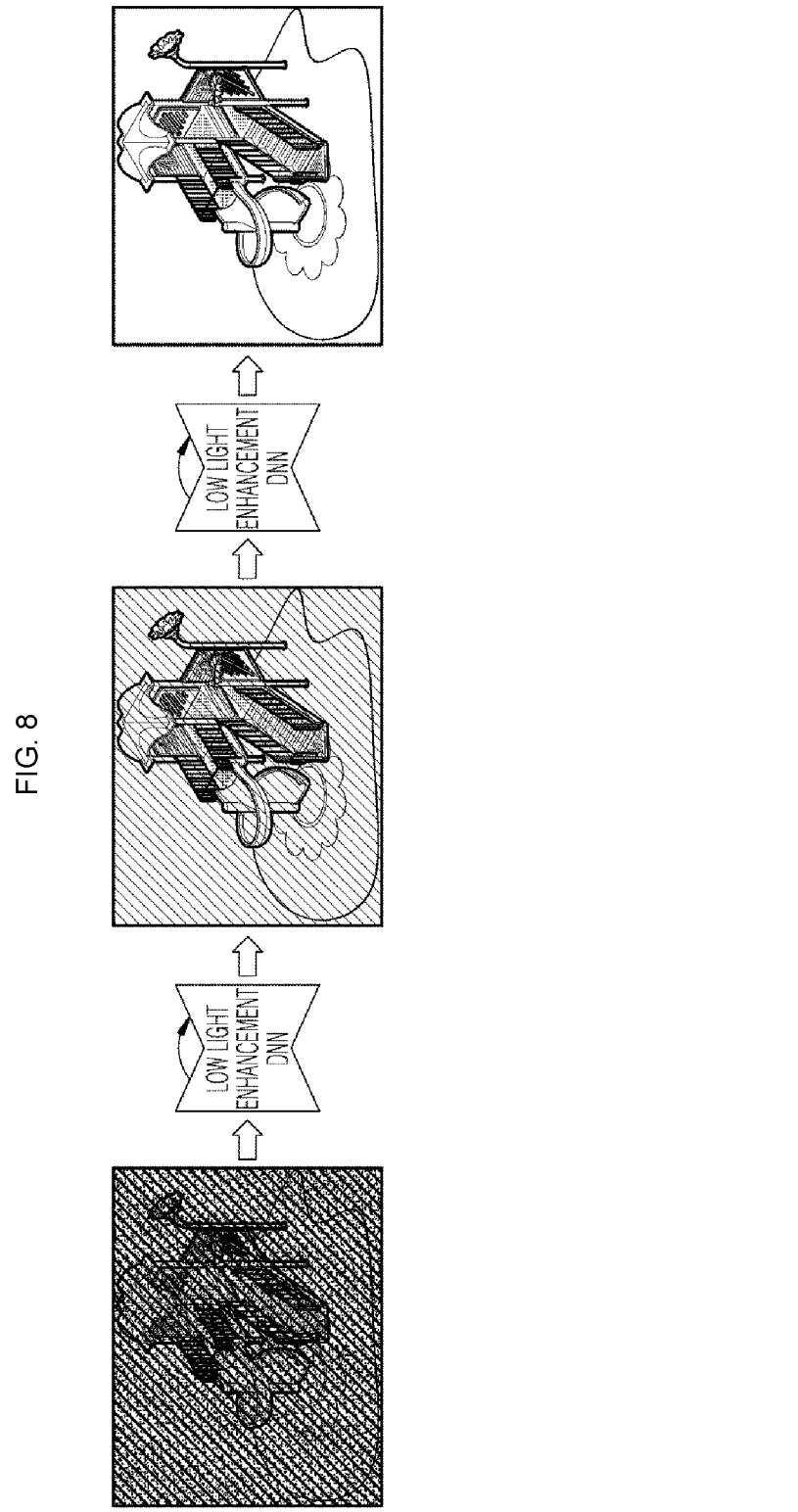
FIG. 8 is an exemplary view of a color restoration method according to an embodiment of the present disclosure.

FIG. 8 is an exemplary view of a color restoration method according to an embodiment of the present disclosure.

Referring to FIG. 8, a low light enhancement process and a color restoration process are illustrated. An input image before low light enhancement may include noise caused by a low light, and may include dark pixels due to the low light. Through the low light enhancement process, at least one among noise reduction, contrast enhancement, super resolution, and brightness enhancement may be improved in the input image. According to an embodiment of the present disclosure, a DNN for enhancing the low light and a DNN for color restoration may be used in the corresponding process.

The processor 180 may pre-process the input image (S120). The pre-processing aims at addressing an issue of the input image caused by the low light, and may include at least one among noise reduction, contrast enhancement, super resolution, and brightness enhancement.

In addition, the processor 180 may reduce noise of the input image by using a DNN model trained through the low light enhancement learning (S121). The DNN model used to remove noise of the input image may be designed based on the CNN. The DNN model may be trained through deep learning of noise reduction by using various methods and training data sets. For example, an image including noise may be used as input data, and a ground truth image may be used as output data. Alternatively, a pair of images that correspond to the same image but differ only in terms of a distribution of noise may be used as input data.

When the input image has an enhanced parameter value other than color through the pre-processing process, a unique color of an object in the image may be properly expressed according to conditions at the time of photographing. However, due to a small amount of light shining into an image sensor, the unique color of the object may be often not properly expressed.

The processor 180 may determine whether the color of the input image is distorted based on the reference image, prior to color restoration (S130).

Figure 9:
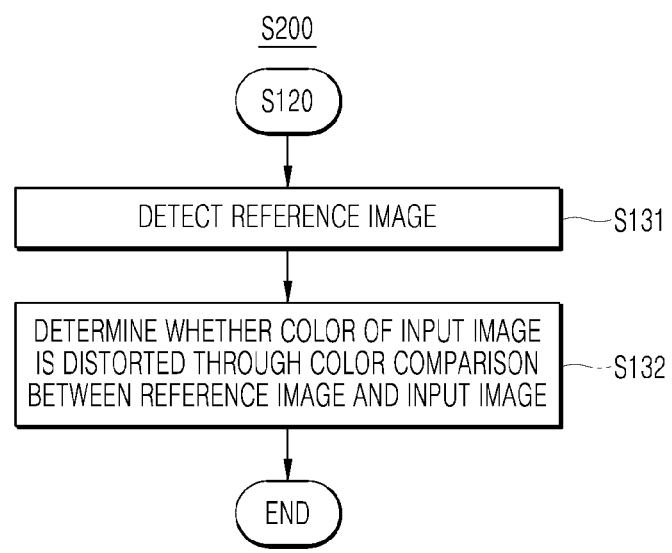
FIG. 9 is a flowchart of S130 in FIG. 6.

FIG. 9 is a flowchart of S130 in FIG. 6.

Referring to FIG. 9, the processor 180 may detect a reference image to be compared with the input image (S131). When the color restoration apparatus 100 is implemented in the form of a terminal, the reference image may be detected among images stored in a storage memory of the terminal or among images stored in a computing device connected to the network 500. The processor 180 may detect an image including an object in the input image and a common object as the reference image.

Figure 10:
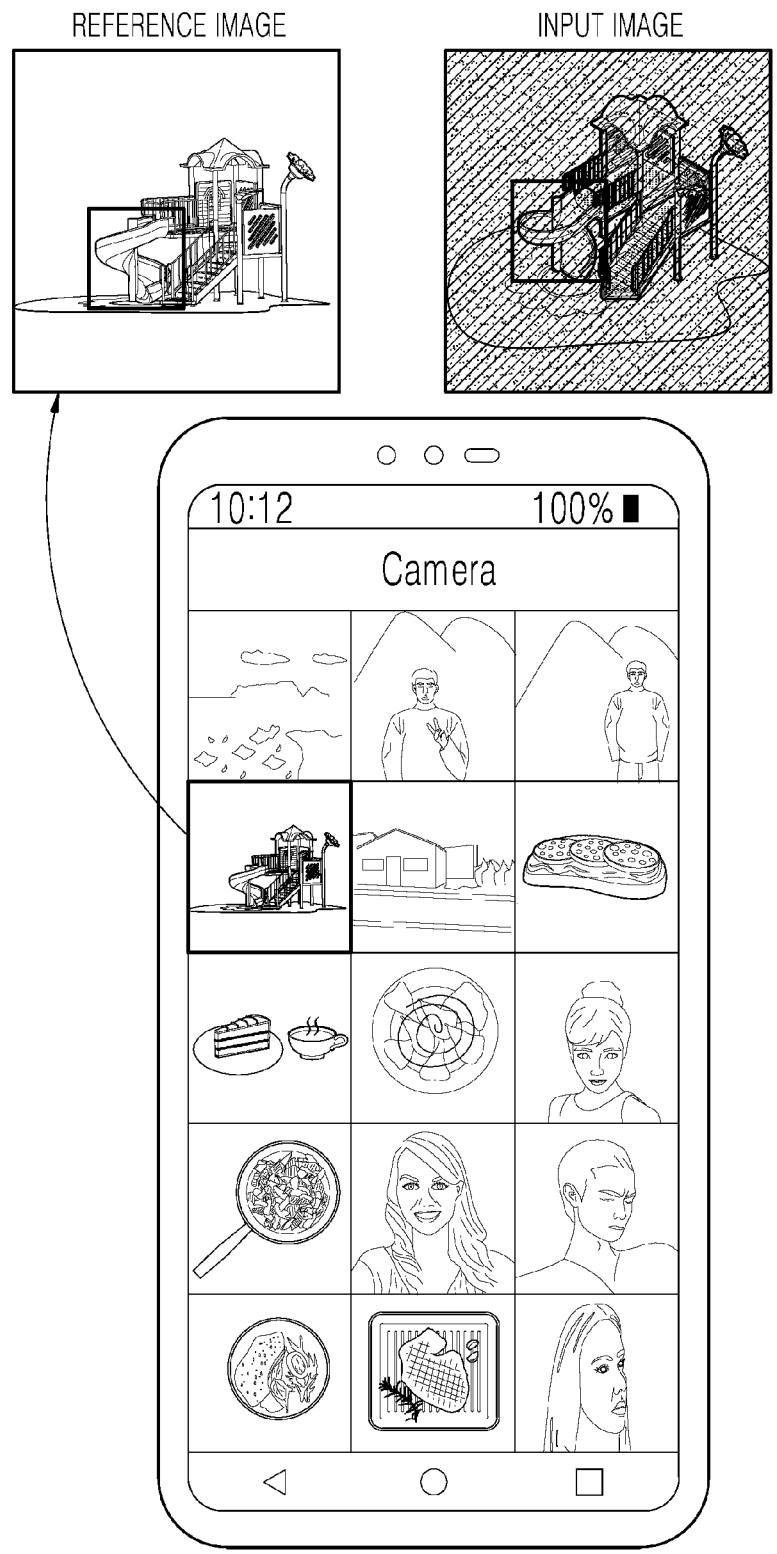
FIG. 10 is an exemplary view of reference image detection according to an embodiment of the present disclosure.

FIG. 10 is an exemplary view of reference image detection according to an embodiment of the present disclosure.

Referring to FIG. 10, there is illustrated a reference image detected among various images stored in the terminal and an input image for determining whether color is distorted by using the reference image. Here, it is illustrated that the reference image and the input image include a slide as an object in common with each other.

In addition, the processor 180 may detect, as the reference image, an image including an object displayed in a single color or an object including a specific color in common among objects displayed in the input image. Referring to FIG. 10, an image that includes a red slide depicted in the input image as a common object may be detected as the reference image.

In addition, the processor 180 may detect the reference image based on at least one condition among a light level of the input image, a type of a light source, a location at which the input image is photographed, and a time. The processor 180 may detect, as the reference image, an image having information similar to light level information, light source information, location information, and time information of the input image, based on image information included in an image of a search target.

When no image including the same object as an object included in the input image is detected, the processor 180 may detect, as the reference image, an image having an RGB distribution most similar to an RGB distribution of the input image among candidate images based on an RGB distribution on a histogram of the input image. For example, an image with a histogram having a similar mutual ratio between R, G, and B in the entire image, or an image with a histogram having a shape similar to a histogram shape of R, G, and B of the input image may be detected as the reference image.

The processor 180 may determine whether the color of the input image is distorted through color comparison between the input image and the reference image (S132). That is, whether the color is distorted may be determined according to whether a difference between pixel values representing a common object shown in both images is within a limit.

When color distortion exists in the input image as a result of comparing the input image with the reference image, the processor 180 may restore the distorted color in the pre-processed input image (S140).

The processor 180 may restore the color of the input image through a test process by using the DNN learned in the previous step. In the test process of color restoration, a target grayscale image or a target color image may be used as input, and a color image may be outputted as a result of color restoration.

The processor 180 may restore color of an RGB scale input image photographed in a low light state by using the DNN trained through deep learning of color restoration (S141).

In addition, the processor 180 may restore color of a grayscale input image, which is scale-converted after being photographed in the low light state, by using the DNN trained through deep learning of color restoration (S142).

In the color restoration process by the DNN, the entire descriptor and semantic histogram of the input image may be calculated. Based on the calculation, the closest cluster and a DNN corresponding to the calculation may be detected.

A feature descriptor may be extracted from each pixel into the input image, and the extracted feature descriptor may be transmitted to the detected DNN. The DNN may obtain a corresponding chrominance value by using the feature descriptor.

The DNN may refine a color value by removing potential artifacts to refine a color value, and may generate a color image by combining the finally refined color value with the input image.

Figure 11:
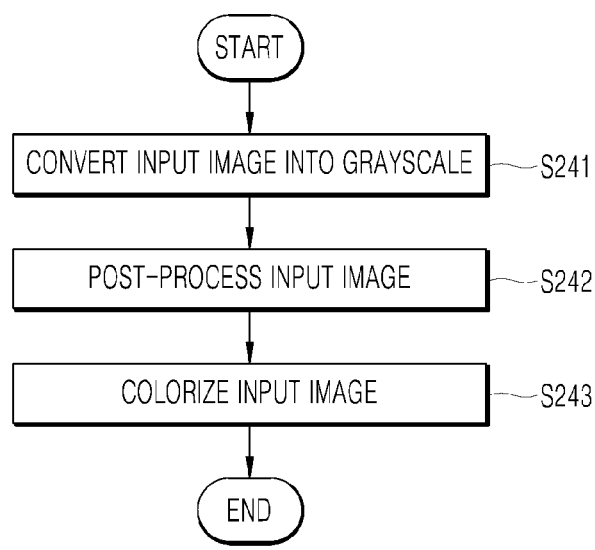
FIG. 11 is a flowchart of color restoration in a grayscale according to an embodiment of the present disclosure.

FIG. 11 is a flowchart of color restoration in a grayscale according to an embodiment of the present disclosure.

Referring to FIG. 11, color restoration of an input image converted into the grayscale (S200) is illustrated. Color restoration at the grayscale may include converting the input image into the grayscale (S241), post-processing the input image (S242), and colorizing the input image (S243).

First, the processor 180 may convert an RGB scale input image into the grayscale by using the scale conversion module 173 (S241).

Some of pre-processing processes for the input image may be performed after the conversion into the grayscale (S242). Therefore, a post-processing process may include a process omitted from the pre-processing among processes for low light enhancement.

The processor 180 may colorize the input image converted into the grayscale by using a DNN trained through deep learning of color restoration (S243).

Figure 12:
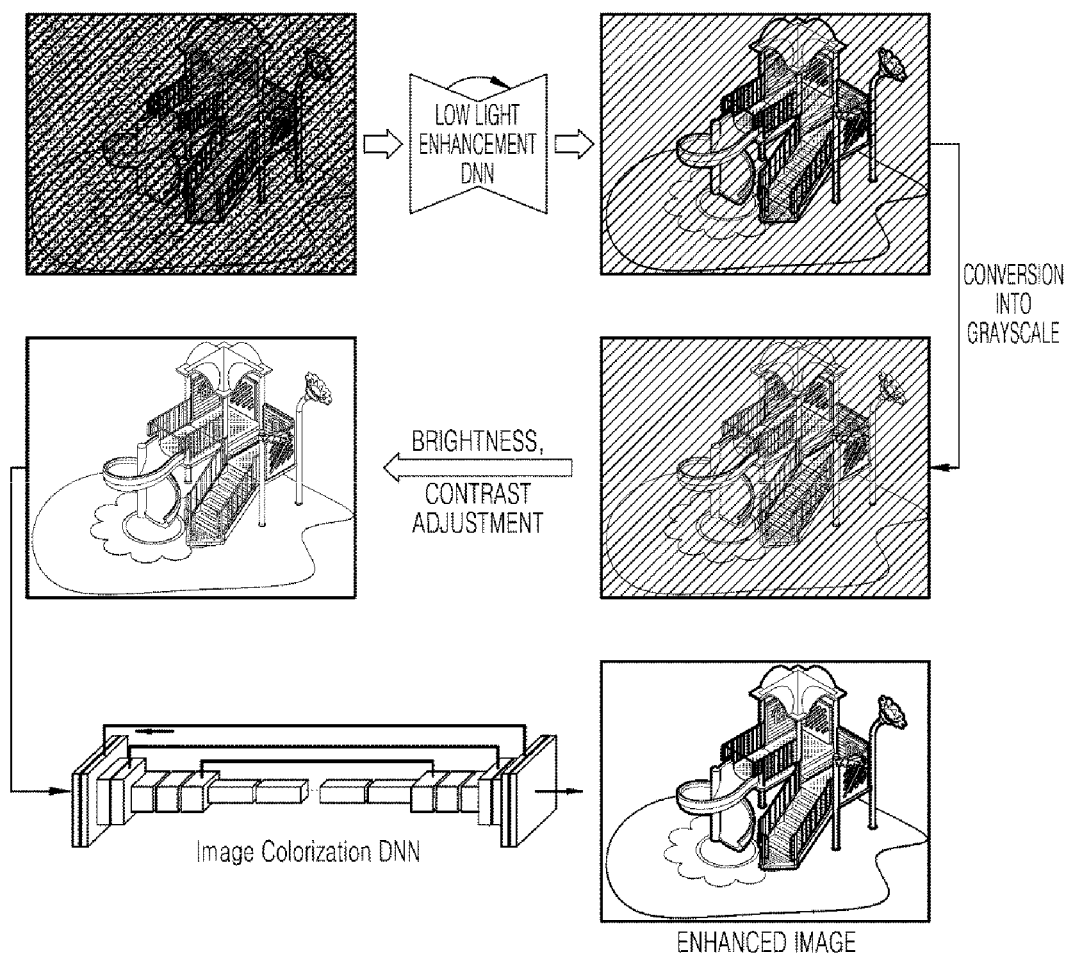
FIG. 12 is an exemplary view of color restoration in a grayscale according to an embodiment of the present disclosure.

FIG. 12 is an exemplary view of color restoration in a grayscale according to an embodiment of the present disclosure.

Referring to FIG. 12, there is illustrated a process in which an input image enhanced using a DNN for low light enhancement is colorized through a grayscale conversion process. In this colorization process, the DNN may perform colorization of each object displayed in the input image based on color information obtained by learning, by using characteristics of an input image inputted via one channel.

Figure 13:
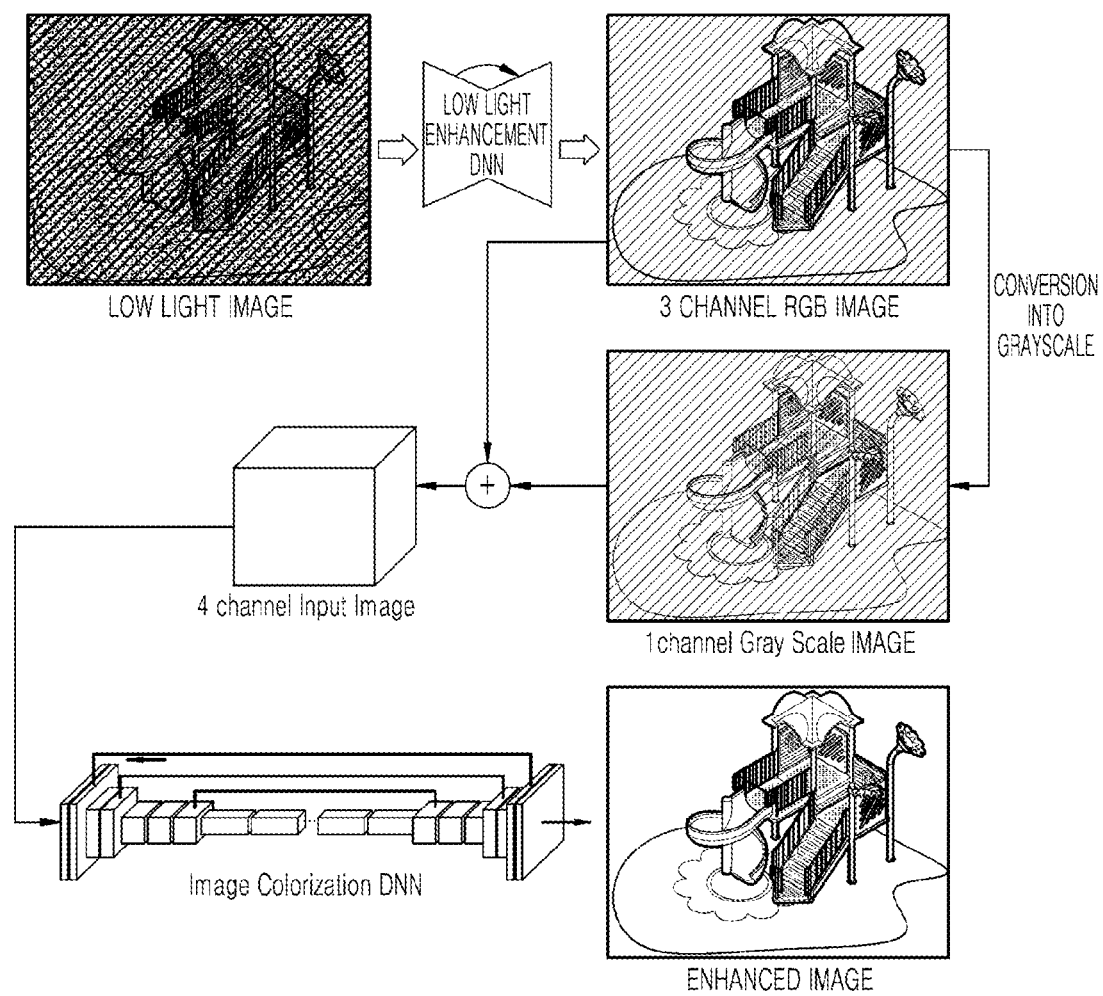
FIG. 13 is an exemplary view of color restoration using four channels according to an embodiment of the present disclosure.

FIG. 13 is an exemplary view of color restoration using four channels according to an embodiment of the present disclosure.

Referring to FIG. 13, there is illustrated another process in which an input image enhanced using a DNN for low light enhancement is colorized through a grayscale conversion process. In this colorization process, the DNN may restore color of each object displayed in the input image based on color information obtained by learning and color information of an input image of a color channel, by using characteristics of an input image inputted via four channels.

In addition, although not illustrated in FIG. 13, color information of a reference image, which is a reference for determining whether the color of the input image is distorted, may be inputted into the DNN as an input of the DNN for color restoration. Therefore, the DNN may restore the distorted color of the input image by using grayscale image information extracted from the input image, color image information, and color information of the reference image.

The DNN used for colorization or color restoration may be designed based on a CNN. Here, the CNN, which is a base, may have a structure in which an encoder and a decoder are included. Layers constituting the encoder may include a convolution layer, a batch normalization (BN) layer, a rectified linear unit (ReLU) layer, and a pooling layer, and layers constituting the decoder may include an upsampling layer, the convolution layer, the BN layer, and the ReLU layer.

Thus, according to an embodiment the present disclosure, natural color restoration is possible, together with brightness correction of an image photographed in a low light environment.

In addition, a low light image photographed by a small-sized camera module having limited shutter speed and aperture adjustment may be corrected to realize original color of an object.

The above-described embodiments of the present disclosure may be implemented in the form of a computer program which can be executed by various components on a computer and the computer program may be recorded in computer readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A color restoration method performed by a color restoration apparatus, the color restoration method comprising:
   pre-processing an input image to generate a pre-processed input image;
   determining whether color of the pre-processed input image is distorted by using a detected reference image; and
   restoring the color of the pre-processed input image in an RGB scale or a grayscale according to whether the color is distorted,
   wherein the determining whether the color of the pre-processed input image is distorted comprises:
      detecting the reference image to be compared with the pre-processed input image; and
      determining whether the color of the pre-processed input image is distorted through color comparison between the pre-processed input image and the reference image,
   wherein the detecting the reference image comprises detecting, as the reference image, an image including an object displayed in a single color or an object including a specific color in common among objects displayed in the input image and having an RGB distribution most similar to an RGB distribution of the input image among candidate images based on an RGB distribution on a histogram of the input image, and wherein the restoring the color of the pre-processed input image in the grayscale comprises:
converting the input image into a grayscale; and
colorizing the grayscale image based on an RGB value of an input image before conversion.

2. The color restoration method according to claim 1, wherein
the pre-processing the input image comprises noise reduction of the input image, and
the noise reduction includes noise reduction by a low light enhancement model of a deep neural network (DNN).

3. The color restoration method according to claim 1, wherein
the detecting the reference image comprises detecting an image including an object in the input image and a common object as the reference image.

4. The color restoration method according to claim 1, wherein
detecting the reference image comprises detecting the reference image based on at least one condition among a light level of the input image, a type of a light source, a location at which the input image is photographed, and a time.

5. The color restoration method according to claim 1, wherein
the restoring the color of the pre-processed input image comprises restoring the color of the pre-processed input image by using a deep neural network (DNN) trained through deep learning of color restoration for an image photographed in a low light environment.

6. The color restoration method according to claim 5, wherein the color of the pre-processed input image is restored by using the DNN based on the reference image.

7. The color restoration method according to claim 5, further comprising:
training the DNN through deep learning of color restoration for an image photographed in a low light environment by using, as input data from a training data set, an image to which at least one among noise reduction, contrast enhancement, super resolution; and brightness enhancement is applied as pre-processing.

8. The color restoration method according to claim 7, wherein
the deep learning of the color restoration includes on-device learning, which is a type of transfer learning performed on the DNN using personal data other than the training data set.

9. A color restoration method performed by a color restoration apparatus, the color restoration method comprising:
pre-processing an input image to generate a pre-processed input image;
determining whether color of the pre-processed input image is distorted by using a detected reference image; and
restoring the color of the pre-processed input image in an RGB scale or a grayscale according to whether the color is distorted,
wherein the determining whether the color of the pre-processed input image is distorted comprises:
detecting the reference image to be compared with the pre-processed input image; and
determining whether the color of the pre-processed input image is distorted through color comparison between the pre-processed input image and the reference image,
wherein the detecting the reference image comprises detecting, as the reference image, an image having an RGB distribution most similar to an RGB distribution of the input image among candidate images based on an RGB distribution on a histogram of the input image.

10. A color restoration apparatus comprising:
a processor configured to pre-process an input image to generate a pre-processed input image; and
a deep neural network (DNN) model configured to restore distorted color of the pre-processed input image in an RGB scale or a grayscale,
wherein the processor determines whether color of the pre-processed input image is distorted by using a detected reference image, and detects as the reference image, an image including an object displayed in a single color or an object including a specific color in common among objects displayed in the input image, and having an RGB distribution most similar to an RGB distribution of the input image among candidate images based on an RGB distribution on a histogram of the input image, and determines whether the color of the pre-processed input image is distorted through color comparison between the pre-processed input image and the reference image, and
wherein the processor controls the DNN to convert the input image into a grayscale, and to colorize the grayscale image based on an RGB value of an input image before conversion.

11. The color restoration apparatus according to claim 10, wherein
the processor detects an image including an object in the pre-processed input image and a common object as the reference image, and determines whether the color of the pre-processed input image is distorted through color comparison of the common object.

12. The color restoration apparatus according to claim 10, wherein
the processor detects the reference image based on at least one condition among a light level of the input image, a type of a light source, a location at which the input image is photographed, and a time.

13. The color restoration apparatus according to claim 10, wherein
the processor controls the DNN trained through deep learning of color restoration for an image photographed in a low light environment to restore the color of the input image.

14. The color restoration apparatus according to claim 13, wherein
the processor controls the DNN to restore the color of the input image by using the DNN based on the reference image.

* * * * *